March 18, 1930.  O. E. SEGRIN  1,750,865
CANDY COATING MACHINE
Filed April 10, 1928   4 Sheets-Sheet 2
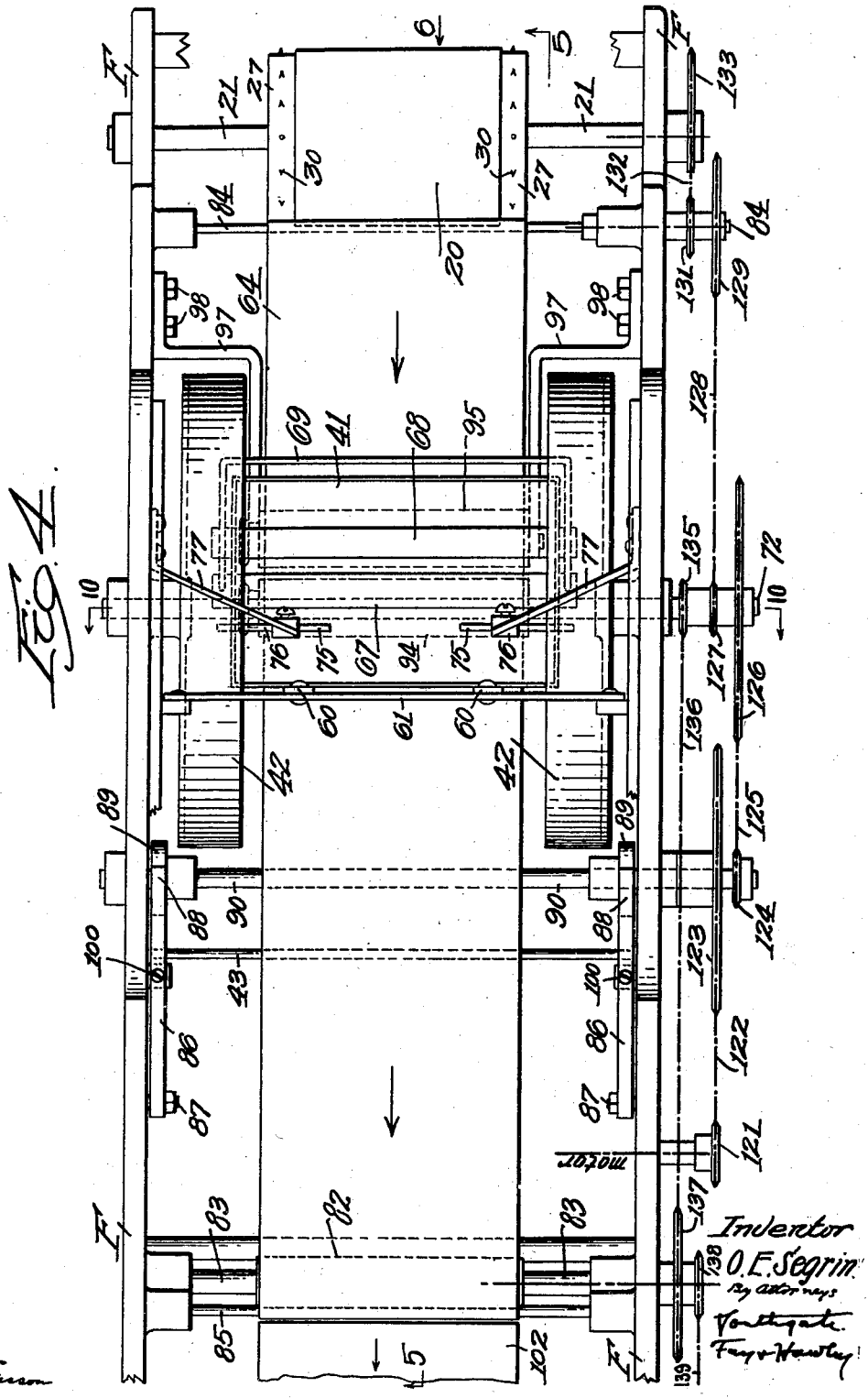

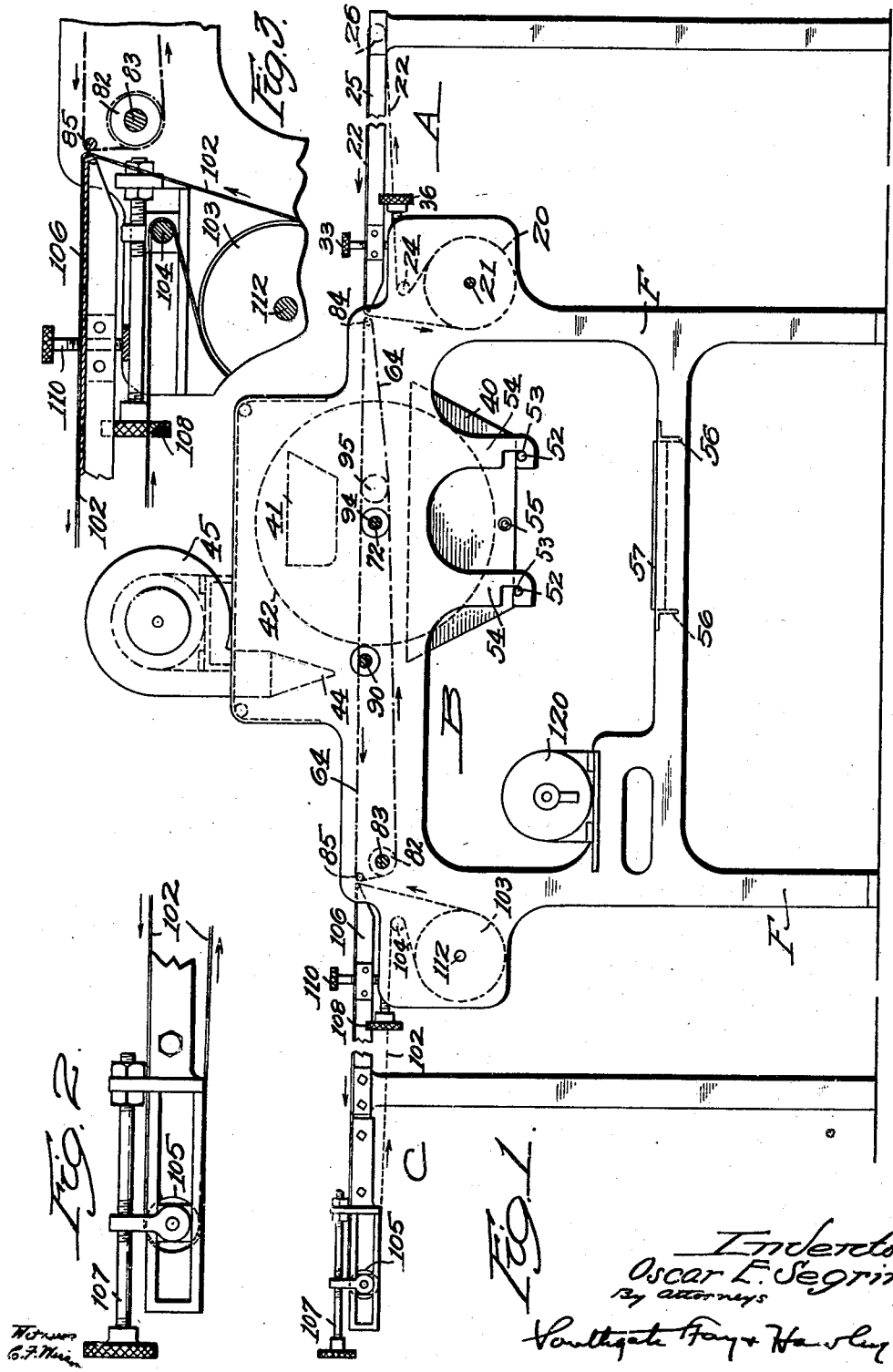

March 18, 1930. O. E. SEGRIN 1,750,865
CANDY COATING MACHINE
Filed April 10, 1928 4 Sheets-Sheet 3
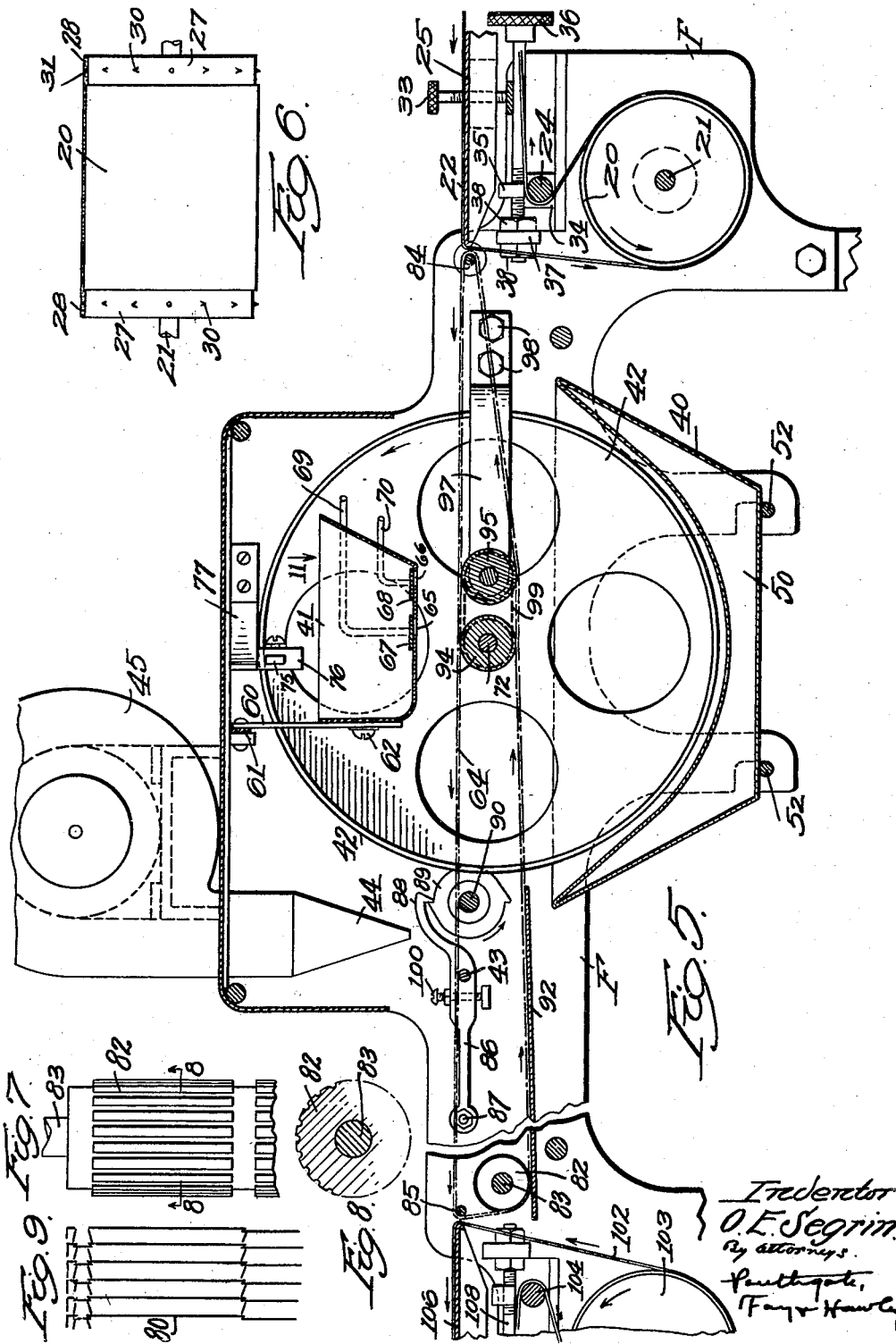

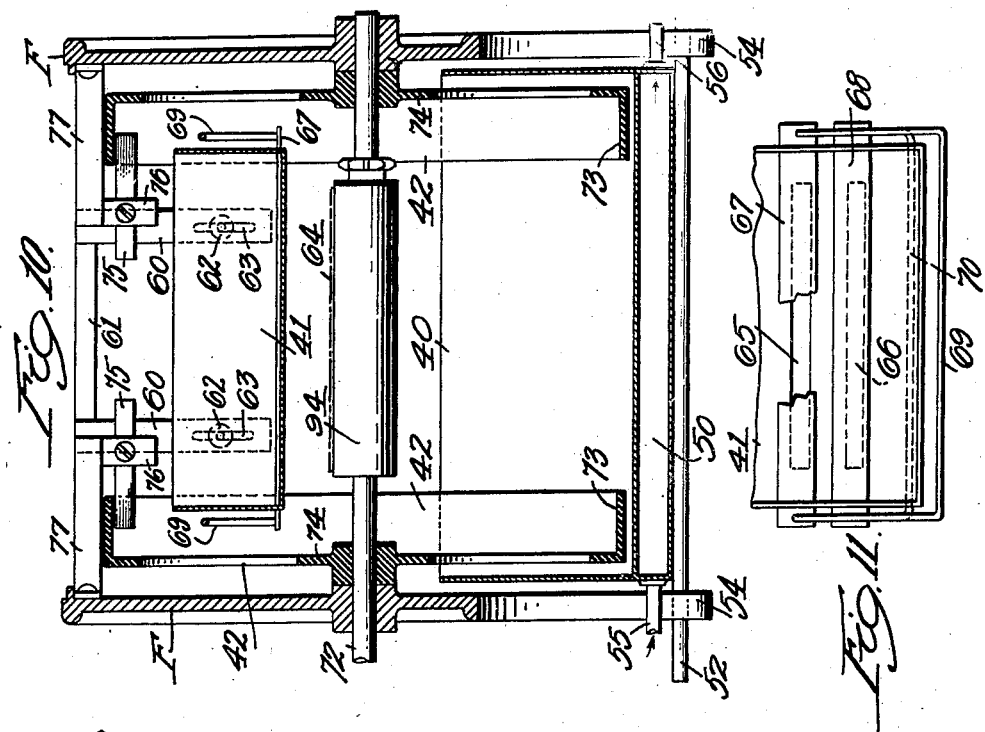

Patented Mar. 18, 1930

1,750,865

UNITED STATES PATENT OFFICE

OSCAR E. SEGRIN, OF SPRINGFIELD, MASSACHUSETTS, ASSIGNOR, BY MESNE ASSIGNMENTS, TO MERROW BROTHERS, INC., OF BOSTON, MASSACHUSETTS, A CORPORATION OF MASSACHUSETTS

CANDY-COATING MACHINE

Application filed April 10, 1928. Serial No. 268,987.

This invention relates to a machine for coating candy centers or other forms of confectionery.

It is the general object of my invention to improve and simplify the construction of such coating machines, making them easier to operate, more accessible, and more readily cleaned of chocolate or other coating material after a run of work is completed.

With this general object in view, an important feature of my invention relates to the provision of an improved and simplified mechanism for elevating the chocolate to the upper delivery tank or flow pan.

A further feature relates to the provision of a quickly detachable reservoir or storage tank which may be readily disengaged and removed for cleaning or other purposes.

My invention further relates to arrangements and combinations of parts which will be hereinafter described and more particularly pointed out in the appended claim.

A preferred form of the invention is shown in the drawings in which—

Fig. 1 is a side elevation of my improved coating machine;

Fig. 2 is an enlarged side elevation of certain conveyor adjusting means;

Fig. 3 is sectional side elevation, showing additional adjusting means;

Fig. 4 is a plan view of the machine;

Fig. 5 is an enlarged sectional side elevation of the middle or coating portion of the machine, taken along the line 5—5 in Fig. 4;

Fig. 6 is a side view of a conveyor drum, looking in the direction of the arrow 6 in Fig. 4;

Fig. 7 is a plan view of a conveyor driving pulley;

Fig. 8 is a sectional end elevation, taken along the line 8—8 in Fig. 7;

Fig. 9 is a detail plan view of a portion of a wire conveyor belt;

Fig. 10 is a sectional end elevation of the coating mechanism, taken along the line 10—10 in Fig. 4;

Fig. 11 is a plan view of a portion of the flow pan and its gate mechanism, looking in the direction of the arrow 11 in Fig. 5;

Fig. 12 is a plan view of the rollers for coating the bottom surfaces of the candy centers; and Fig. 13 is an enlarged side elevation, showing the manner of detaching and removing the storage tank.

Referring to the drawings, I have shown my improved coating machine as comprising a feed portion A, a middle or coating portion B, and a delivery portion C.

The feed portion A comprises a drum 20 (Figs. 5 and 6) mounted on a shaft 21 rotatable in the machine frame F and continuously rotated by driving mechanism to be described. A conveyor belt 22 is driven by the drum 20 and is guided by a cross bar or roll 24, a guide-plate 25, and an outer cross bar or roll 26 (Fig. 1).

The edge portions 27 (Fig. 6) of the drum 20 are preferably of less diameter than the middle portion of the drum and the edge portions 28 of the conveyor belt 22 are correspondingly thickened. The drum portions 27 are preferably provided with spurs or studs 30, projecting outward from the drum and received in pockets or recesses 31 in the thickened edge portions 28 of the conveyor belt. The belt is positively driven by the spurs 30 and is held from lateral displacement by the co-operation of the thickened belt edges with the reduced end drum portions 27.

The guide plate or table 25 is mounted for vertical adjustment at its left hand end, as viewed in Fig. 5, and is provided with an adjusting screw 33 by which it may be vertically aligned with the conveyor in the coating section B of the machine. The guide bar or roll 24 is mounted on sliding blocks 34 (Fig. 5) having projections 35, threaded to receive an adjusting screw 36, rotatable in a bearing or bracket 37, and held from axial movement therein by nuts 38, one of which may be tightened after adjustment to act as a lock nut. By adjustment of the cross bar or roll 24, the tension of the conveyor belt 32 may be varied as desired.

In the operation of the machine, the candy centers or other articles to be coated, are deposited on the feed conveyor 22 and are continuously advanced by the conveyor to the middle or coating portion B of the machine.

Coating mechanism

The coating mechanism, as best shown in Fig. 5, comprises a storage tank or reservoir 40, a delivery tank or flow pan 41, a pair of elevating drums 42, a rapping bar 43, an air nozzle 44 and a fan 45.

The reservoir or storage tank 40 is preferably formed with inner and outer walls, spaced apart as indicated in Fig. 5, to provide a jacket space 50, to which steam or hot water may be admitted to melt the chocolate and keep it at the proper temperature for coating operations.

The reservoir 40 is provided with supporting bars 52 adapted to be seated in L-shaped notches or recesses 53 (Fig. 13) in the lower ends of arms 54 projecting downward from the frame F of the machine. A suitable inlet pipe 55 (Fig. 10) and outlet pipe 56 are provided for the water or steam jacket 50.

Cross bars 56 (Fig. 13) are provided between the sides of the frame F and rolls 57 are mounted on the cross bars 56. When it is desired to remove the tank 40, the cross rods 52 are elevated and displaced laterally from the recesses 53 and are then lowered until they rest upon the rolls 57, as indicated in Fig. 13. The tank may be then drawn forward through the large side opening in the frame F and may be removed and replaced as desired.

This radially detachable and removable construction of the storage tank permits me to quickly and easily change from one coating material to another by removing one tank and substituting a different tank therefor, and it also permits the tank to be removed after the run is completed, so that the chocolate or coating material may be cleaned out, or the tank may be placed in suitable storage.

The flow pan or delivery tank 41 is mounted on arms 60 (Fig. 10) depending from a cross bar 61 supported by the machine frame F. The flow pan 41 is secured to the arms 60 by clamping screws 62, extending through slots 63 (Fig. 10) in the arms 60. The flow pan 41 is thus mounted for convenient vertical adjustment toward and away from the coating conveyor 64.

The bottom of the pan 41 is provided with two gate openings 65 and 66 (Fig. 11) which may be closed to any desired extent by slides 67 and 68. U-shaped handles 69 and 70 are provided by which the slides 67 and 68 may be adjusted to regulate the flow of chocolate as desired.

In the operation of the machine, it is necessary to continuously return the chocolate from the storage tank 40 to the flow pan or delivery tank 41. For this purpose I provide two drums or pulleys 42 (Fig. 10), mounted on a cross shaft 72 supported in bearings in the frame F. The drums are mounted at such a height that they will dip nearly to the bottom of the storage tank 40 and they are provided with rims or flanges 73 projecting laterally from the web 74 of the drums and extending inward beyond the ends of the flow pan 41.

The drums 42 rotate at each side of the coating conveyor 64 and in their passage through the chocolate in the tank 40, they become thickly coated with the melted chocolate, carrying the same around with them in their rotation.

When the chocolate approaches the highest point of its travel, it is removed by scrapers 75 (Fig. 4) slidably mounted in the depending arms 76 (Fig. 10) of brackets 77 fixed to the frame F. The scrapers 75 may be adjusted in the arms 76 so as to project to a greater or less extent under the overhanging rims of the drums 42, thus removing larger or smaller quantities of chocolate therefrom, according to the requirements of the particular coating operation being performed. I am thus able to regulate the delivery of chocolate to the flow pan by laterally adjusting the scrapers 75.

Coating conveyor mechanism

As previously stated, the candy centers are transported through the coating mechanism B by a conveyor belt 64. This belt is preferably formed of bent wire members 80 (Fig. 9) linked together to form an open mesh belt through which the surplus chocolate may be readily returned to the storage tank 40.

The conveyor belt 64 is driven by a grooved or corrugated drum 82 (Figs. 7 and 8), mounted on a driving shaft 83 near the delivery end of the coating section B. Guidebars or rolls 84 and 85 are provided at the opposite ends of the coating section, and the belt 64 in the middle portion of its upper or operative run is also supported by a rapping bar 43.

The bar 43 is mounted in levers 86, pivoted at 87 to the opposite sides of the frame F, and having hook-shaped swinging ends 88 (Fig. 5) engaged by cams 89 mounted on a cam shaft 90, supported in suitable bearings in the frame F. At each revolution of the shaft 90 the rapping bar 43 is twice gradually raised and quickly dropped, thus vibrating the wire belt 64 and causing surplus chocolate to be shaken off.

The chocolate thus shaken off falls through the upper run of the belt 64 and is deposited on the lower run above a protecting bottom plate 92, which extends to the right beyond the edge of the storage pan 40.

A pair of rolls 94 and 95 (Fig. 5) are mounted between the upper and lower runs of the belt 64 and almost directly beneath the gate openings in the flow pan 41. The roll 94 is mounted on the shaft 72 rotatable in bearings in the frame F and having driving connections to be described. The roll 95 is mounted in brackets 97 (Figs. 5 and 12) which are secured by bolts 98 (Fig. 5) to the frame F at points beyond the periphery of the drums 42. The roll 95 is driven from the roll 94 by a sprocket and chain connection 99 best shown in Fig. 12.

The rolls 94 and 95 act to support the belt 64 under the flow pan 41 and also have a wiping action by which the chocolate is caused to back up under the candy centers, thus coating the bottom surfaces thereof.

Adjusting screws 100 are provided in the rapping levers 86 to regulate the normal height of the rapping bar 43. The fan 45 is mounted above the rapping mechanism and is designed to deliver a blast of air through the nozzle 44, effective to assist in the removal of surplus chocolate or coating material from the confectionery as it leaves the coating point and is conveyed toward the delivery end of the machine.

Delivery mechanism

The delivery mechanism comprises a conveyor belt 102 (Figs. 1, 2 and 3) actuated by a drum 103 and passing around guide-rolls or bars 104 and 105 and over a guide-plate 106, all substantially similar to the corresponding parts in the feeding mechanism A previously described. The outer guide-roll 105 may be adjusted longitudinally to vary the tension of the belt by an adjusting screw 107 (Fig. 2) and the inner guide-roll 104 may be similarly adjusted by an adjusting screw 108 (Fig. 3). The guide-plate 106 may be raised or lowered by means of the vertical adjusting screw 110. The belt 102 and drum 103 may be similar in construction to the belt 22 and drum 20 previously described, and the drum 103 is mounted on a shaft 112 continuously rotated by driving connections to be described.

Driving mechanism

Having described the several parts of my improved coating machine, I will now describe the mechanism for actuating the same.

A motor 120 (Fig. 1) is mounted on the frame F and rotates a sprocket 121 (Fig. 4) which is connected by a chain 122 to a large sprocket 123 on the rapping cam shaft 90. A small sprocket 124 on the shaft 90 is connected by a chain 125 to a large sprocket 126 on the shaft 72 which support and rotates the drums 42. A small sprocket 127 on the shaft 72 is connected by a chain 128 to a larger sprocket 129 on the guide roll 84, which in turn is connected by a small sprocket 131, chain 132 and larger sprocket 133 to the shaft 21 which rotates the feeding conveyor drum 20. A second small sprocket 135 on the shaft 72 is connected by a chain 136 to a larger sprocket 137 on the driving pulley shaft 83 which actuates the conveyor belt 64. A small sprocket 138 on the shaft 83 is connected by a chain 139 to a larger sprocket (not shown) on the drum shaft 112 of the delivery conveyor mechanism. I have thus provided means for driving the three conveyor belts, as well as the drums 42 and the rapping cam shaft 90, all in predetermined speed relations.

Having made clear the details of construction and operation of my improved coating machine, it will be seen that I have provided a simply and conveniently operated machine, all parts of which are readily accessible and so constructed that they may be easily cleaned of chocolate and removed from the machine when so desired.

Having thus described my invention and the advantages thereof, I do not wish to be limited to the details herein disclosed, otherwise than as set forth in the claim, but what I claim is:—

A coating machine comprising side frame members, a storage tank supported between said members, a flow pan, a pair of drums rotatable in vertical planes between said members and each having a portion of its peripheral path dipping within said storage tank and a portion elevated above said flow pan, each of said drums having a rim offset toward said flow pan and overlapping the adjacent end of said pan, brackets secured to each side frame member and projecting inward over and beyond said offset rims, an arm depending from each of said brackets and having a horizontal aperture, a separate scraper bar slidable in each of said apertures with its operative end positioned within one of said offset rims, and means to secure said bars in adjusted position in said arms, whereby the feed of coating material may be regulated.

In testimony whereof I have hereunto affixed my signature.

OSCAR E. SEGRIN.